United States Patent [19]

Williams, Jr. et al.

[11] 3,847,142

[45] Nov. 12, 1974

[54] BLOOD FLOW MEASURING APPARATUS AND METHOD

[75] Inventors: Redford B. Williams, Jr., 2748 Middleton St., Durham; John W. Hartwell, Hillsborough, both of N.C.

[73] Assignee: said Williams, by said Hartwell

[22] Filed: Aug. 30, 1973

[21] Appl. No.: 393,203

[52] U.S. Cl............................ 128/2.05 F, 128/2.05 V
[51] Int. Cl................................................ A61b 5/02
[58] Field of Search ..... 128/2.05 F, 2.05 V, 2.05 R, 128/2.05 M, 2.05 A

[56] References Cited
UNITED STATES PATENTS

| | | | |
|---|---|---|---|
| 2,667,159 | 1/1954 | Goldberg et al. | 128/2.05 V |
| 3,268,845 | 8/1966 | Whitmore | 128/2.05 V X |
| 3,340,867 | 9/1967 | Kubicek et al. | 128/2.05 V |
| 3,517,661 | 6/1970 | Buffington | 128/2.05 V |
| 3,570,474 | 3/1971 | Jonson | 128/2.05 V |

Primary Examiner—Kyle L. Howell

[57] ABSTRACT

A portable apparatus and method for determining the rate of blood flow uses the relationship between volume and circumference changes in a limb. A change in limb circumference is measured over a timed interval to give the rate of flow. The venous outflow in the limb is temporarily occluded during this interval.

6 Claims, 6 Drawing Figures

PATENTED NOV 12 1974 3,847,142

BLOOD FLOW MEASURING APPARATUS AND METHOD

BACKGROUND OF THE INVENTION

1. Field of the Invention

The invention relates to medical measuring apparatus and methods and particularly to portable apparatus and to methods for determining the rate of blood flow in a limb.

2. Description of the Prior Art

In medical and physiological research and in general medical practice, it is desirable to measure in humans what is referred to as forearm or calf blood flow, that is, the rate at which blood is entering the limb in question. Forearm blood flow is largely determined by the rate of flow through the skeletal muscles of the forearm, with a smaller contribution from the rate of flow through the skin. An understanding of circulatory responses in the presence of acute myocardial infarction and/or heart failure and recent research findings suggest that knowledge of forearm blood flow could be of value in the diagnosis and treatment of these disorders, as well as other disorders in which the circulatory response may be of concern. At the present time there is no known noninvasive apparatus which provides a measure of the absolute rate of forearm blood flow. Impedance and ultrasound devices presently on the market provide only a relative measure. Electromagnetic flow probes are also available. However, while such probes do give an absolute measure they have the disadvantage of requiring surgical exposure of the blood vessel. Furthermore, the techniques and instrumentation used to derive measures of forearm blood flow (FBF) heretofore have been used only in research settings and require extensive training and experience for their employment. There is no kind of compact, portable unified system for performing this task. Additionally, the technique for converting the chart readings to flow is time consuming unless the lab has a digital computer interfaced with the apparatus. If this potentially useful FBF measure is to be obtained on a large scale in general medical settings, it must be obtainable in a readily usable form by a wide range of personnel, some of whom may have limited training.

Of further interest to an understanding of the invention is the fact that percentage changes in the volume of elastically deformable objects (such as the forearm or calf) of cylindrical or subcylindrical shape can be reliably approximated by twice the percentage change in circumference of such objects. The invention employs this relationship between volume and circumference changes in the limb for purposes of measuring FBF by arranging for the venous outflow of blood from the arm to be temporarily occluded. By measuring the change in limb circumference resulting from the continued arterial inflow over a timed interval, the rate of blood flow into the limb can be determined.

SUMMARY OF THE INVENTION

While generally applicable to the measurement of volume changes over any time in any cylindrical or subcylindrical limb in humans or animals using strain gauge plethysmography, the embodiment chosen to illustrate the invention is concerned with the determining of the rate of blood flow into the human forearm. The embodiment described comprises, in general, the provision of a wrist cuff to occlude completely the blood flow to the hand (the hand circulation differs from that of the forearm in being determined largely by skin, rather than muscle, blood flow), a cuff about the upper arm which can be rapidly inflated, e.g., in one to five seconds, to a pressure just below diastolic blood pressure, so that the venous outflow from the arm is occluded, but the arterial inflow continues substantially unimpeded; and a mercury in rubber strain gauge of standard type, which is placed about the largest part of the forearm to detect changes in its circumference. While conventional inflatable wrist cuffs are preferred any equivalent occluding means may be employed. The mentioned strain gauge forms one arm of a Wheatstone bridge circuit, the output voltage of which varies in a linear fashion according to the length of the strain gauge; the rate of change in strain gauge length, and hence in arm circumference, can then be converted by digital logic circuitry into percentage change in forearm volume over time and numerical data obtained as an indication of the rate of forearm blood flow. The described components and the method employed lend themselves to being embodied in a highly compact, portable system.

With the foregoing in mind, the invention has as an object the provisions of a FBF measuring apparatus and method which requires no extensive specialized training to use and which provides output data which is immediately interpretable without the need of further data analysis or manipulation.

An object is also that of providing a FBF measuring method and apparatus which uses the relationship between percentage change in volume and percentage change in circumference of a limb to provide a measure of the absolute rate of blood flow into the limb and which does not entail the use of invasive techniques.

Another object is the provision of a novel FBF measuring apparatus and method whereby digital logic circuitry is employed to enable a relatively untrained person to enter a minimum of information into the apparatus and then with a minimum of further manipulation to use the apparatus to obtain immediately interpretable FBF output data and wherein the apparatus is portable.

DESCRIPTION OF THE PREFERRED EMBODIMENT

The invention will be explained first in general terms, then in reference to the specific operations performed by a representative digital logic circuitry and finally in reference to the more specific fashion in which such digital logic circuitry performs the required operations.

I. GENERAL DESCRIPTION

Figure 1:
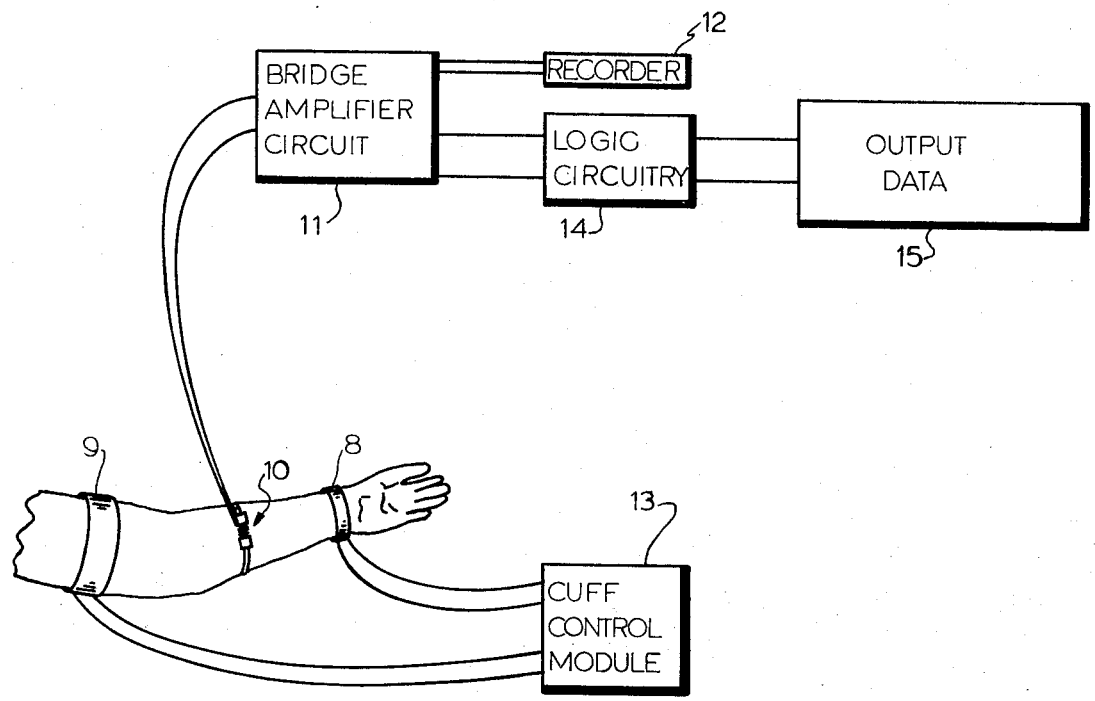
FIG. 1 is a block diagram illustrating the invention.

To obtain a general understanding, reference is first made to the block diagram in FIG. 1 in which the invention is shown in schematic and general form. The subject's forearm is encircled at its largest part by a mercury in rubber type strain gauge 10 which forms with suitable impedance matching one arm of a Wheatstone bridge and amplifier circuit 11, the output of which is amplified and recorded on a strip chart recorder 12. For the bridge amplifier circuit 11 there may be employed a Model 270 impedance plethysmograph made by Parks Electronics, Beaverton, Oregon, and which is basically a circuit that operates like a Wheatstone bridge. A type of mercury in rubber strain gauge calibrator device suited to the invention is also known and is described in Whitney, R. J., J. Physiol. (London): 121: 1–27, 1953.

A cuff control module 13 is employed with which the operator completely occludes the blood flow to the hand by inflating a wrist cuff 8 to a pressure greater than systolic blood pressure. The operator then occludes the venous outflow from the forearm by inflating an upper arm cuff 9 to a pressure just below diastolic blood pressure. Before venous occlusion is accomplished, the operator has already entered the calibration factor and the arm circumference. The digital logic circuitry then determines the change in length of the strain gauge over a specified time interval and converts this percentage change in circumference to that percentage change which would occur over one minute in the volume of the forearm. The forearm blood flow thus derived and expressed in units of ml/100 ml of arm/minute is then printed out on a digital printer 15 to provide a permanent written record of the forearm blood flow rate.

Figure 2:
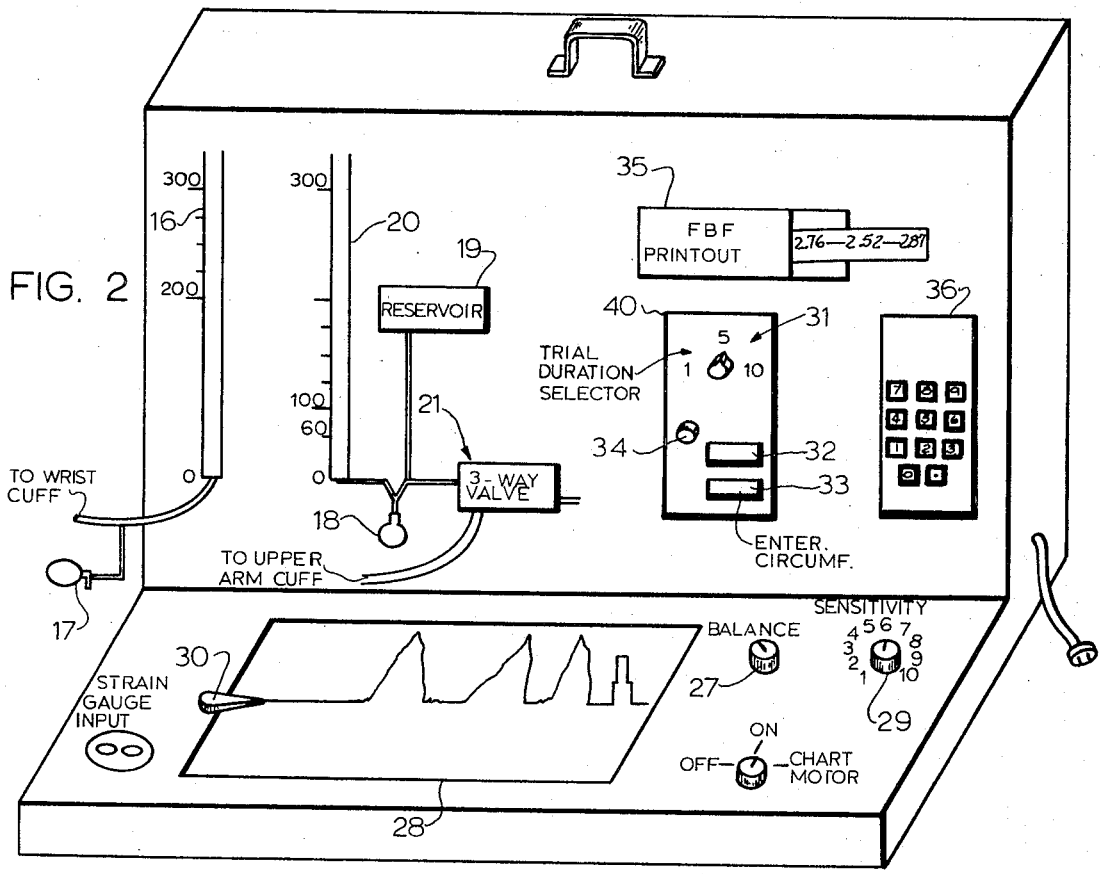
FIG. 2 is a perspective view of an apparatus embodying the invention.
Figure 3:
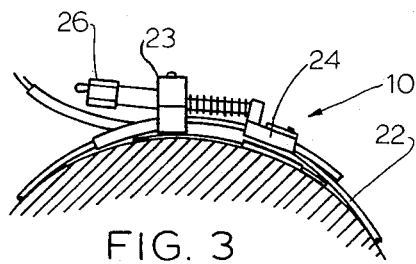
FIG. 3 is a schematic side view of a strain gauge with a calibrator device and which is shown mounted on a limb in the manner of the invention.
Figure 4:
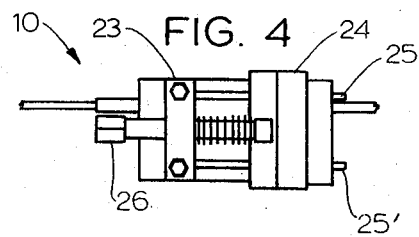
FIG. 4 is a partial schematic plan view of the calibration portion of the strain gauge.

The invention is next described in somewhat more detail in reference to FIG. 2. However, since those skilled in the art are generally familiar with the circuitry required, no attempt has been made in FIG. 2 to show details of the circuits beyond indicating the function and controls required to perform those functions. In FIG. 2, the cuff control module 13, shown in FIG. 1, includes a mercury manometer 16 to which the wrist cuff 8 is attached; the operator then uses the bulb 17 to pump up cuff 8 to a pressure greater than the systolic blood pressure, shown in FIG. 2 as 200 mm Hg. When ready to begin making measurements of FBF, the operator uses the bulb 18 to charge the reservoir 19 with a presure just below diastolic blood pressure, here shown as 60 mm Hg on the venous occlusion manometer 20, with the three way valve 21 connecting the reservoir with the upper arm cuff 9 in such a position as to shut off cuff 9 from reservoir 19. While not shown, automatic pumping means may be employed to deliver these pressures. When ready to begin measurement, the operator will open valve 21 so that the upper arm cuff 9 receives the pressure with which reservoir 19 has been charged. Prior to this, the operator will have placed the strain gauge 10 around the largest part of the forearm using the holder-calibrator portion of gauge 10 shown in FIG. 3. As explained in the publication previously referred to, the holder-calibrator body is made of a non-conductive material such as "Plexiglas." One end of the strain gauge portion 22 of strain gauge 10 is attached to the stationary end 23 of this holder-calibrator, while the other end is attached to a bar 24 which is attached to two guide bars 25, 25', and is moved along bars 25, 25', by means of a screw 26 such that one full turn of the screw causes the movable bar to move 0.50 millimeters.

Returning now to FIG. 2, after the strain gauge 10 is in place on the forearm the operator will balance the bridge using a balance control knob 27. Once the bridge is balanced, as indicated by obtaining a pulse tracing on the strip chart recorder 28, the operator next opens the three-way valve 21 between the reservoir 19 and upper arm cuff 9 to obtain a practice reading. If the flow rate is too high the pen will rise too rapidly, and it may be necessary at this point to decrease the sensitivity of the amplifier using the amplifier sensitivity control knob 29. To release the pressure in cuff 9, valve 21 is turned to open the cuff to the atmosphere. With the sensitivity setting such that a linear trace lasting at least six to eight seconds before reaching the top of the chart is obtained upon venous occlusion, the operator will determine the calibration factor by pressing the self-latching "calibrate" button 32 while the calibrator screw 26 is given two full turns, causing the strain gauge to become one millimeter longer. The voltage output of the amplifier during this operation is thus read into the digital logic circuitry as the voltage output of the bridge circuit for one millimeter of actual change in length of the strain gauge. Next, the operator enters the arm circumference at the point of application of the strain gauge using the "enter circumference" button 33. With these two inputs the digital logic circuitry is ready to receive inputs from the recorder and the operator initiates this process by first charging the reservoir 19, then opening the three-way valve 21 between reservoir 19 and the upper arm cuff 9. Upon observing that the pen of the recorder 28 is describing a linear function, free from movement artifacts, the operator then presses the "start FBF" button 34 to initiate the sampling of the amplifier-recorder output voltage by the digital logic circuitry.

Figure 5:
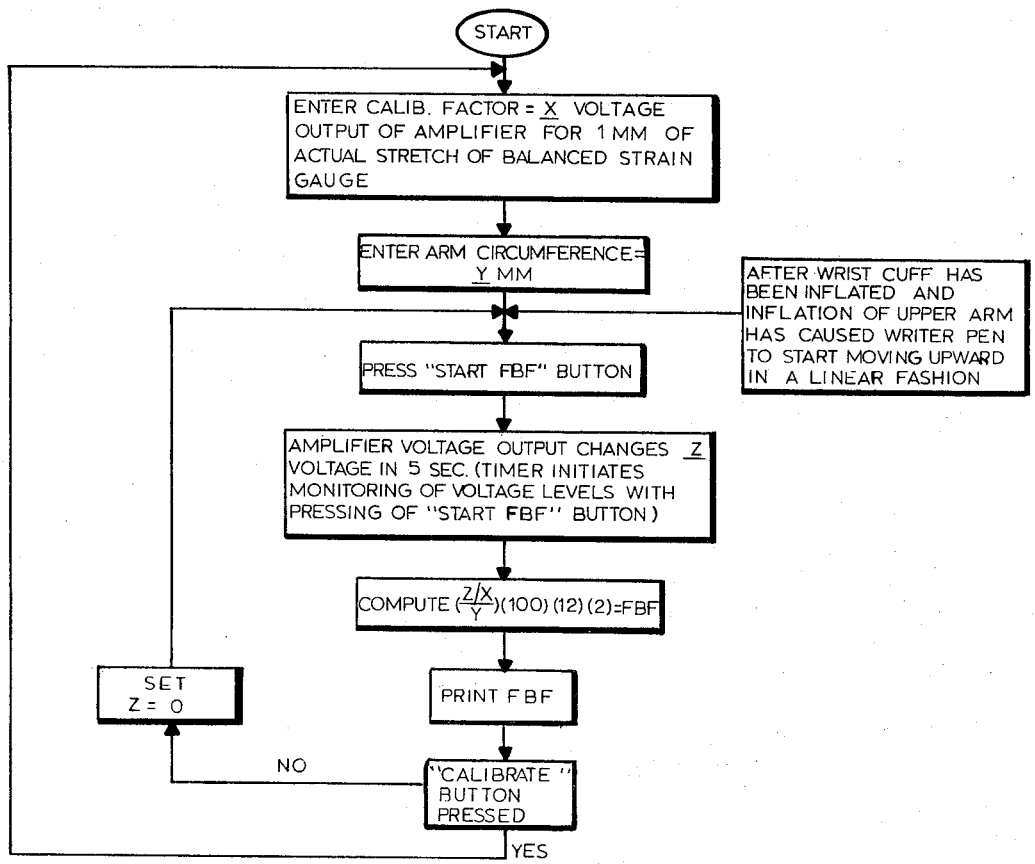
FIG. 5 is a flow chart describing the operations of a logic circuitry which may be used to provide a readout of the blood flow information.

One embodiment of a digital logic circuitry which may be used to compute and output FBF data is shown in flow-chart form in FIG. 5. Referring back to FIG. 2, it will be noted that by pressing the "calibrate" button 32 the operator resets all values in the digital logic circuitry and such circuitry is designed with this function in mind. Having set the sensitivity control 29 of the amplifier at a setting that maintains a linear tracing of the writer pen 30 over a period of time suited to the flow rate of the subject, e.g., 6 to 8 seconds, the operator then turns the screw 26 of the holder-calibrator through a set number of turns so that the strain gauge length is changed a set amount while the "calibrate" button 32 is depressed, thus entering into the logic circuitry the voltage output of the recorder-amplifier for the sensitivity setting given when the strain gauge lengthens by a set amount (one millimeter). It would also be possible to have a voltmeter and manually enter this voltage change. Using the "Enter Circumference" button 33 and the numeric input keyboard 36, shown in FIG. 2, the operator enters the arm circumference at the point on the forearm (equally applicable to the calf) at which the strain gauge is applied. The operator then inflates the wrist cuff to 200+ mm Hg, charges the reservoir 19 with a pressure just below diastolic, and opens the three-way valve 21 so that the pressure in the reservoir is applied to the upper arm cuff 9.

The operator next selects any of several sampling periods, using the trial duration selector switch 31 which is shown set at 5 seconds in FIG. 2. While the embodiment shown allows for selecting different time intervals, it should be understood that for many applications of the invention a fixed time interval, e.g., 5 seconds, may be used. The operator then observes the tracing described by the writer pen 30, and as soon as it appears linear, depresses the "start FBF" button 34. In this embodiment, the digital logic circuitry then samples the output voltage of the recorder-amplifier for five seconds and compares the voltage change ($z/x$ in FIG. 5) with that occurring when the strain gauge was stretched a set amount (1 millimeter) during the calibration. (A warning light, not shown, may be provided to come on after five seconds so that the operator is reminded to deflate the cuff.) This fraction ($z/x$) is then divided within the logic circuitry by the arm circumference y and multiplied first by 100 to give the percentage change in circumference in 5 seconds. This value is multiplied by 12 for a 5 second sampling period to give the percentage change in circumference in 1 minute. This last value is multiplied by 2 to convert the percentage circumference change in one minute to the percentage volume change per minute. This last value is printed out on the digital printer 35, FIG. 2, as the FBF in units of ml flow/100 ml of arm/minute. An alternative method to be followed within the logic circuitry is to sample the voltage tracing at a fast rate, e.g., every 30 milliseconds, and then use least squares techniques to compute the equation of the line, thus deriving a function from which the voltage change in one minute might be obtained to allow computation of FBF as specified above. The important concept to be recognized is the basic principle of determining by some readily applicable method the amount of change in length undergone by the strain gauge over one minute, or any time interval, so that the percentage change in circumference and volume per unit time can then be computed. One minute is arbitrarily set, since that is the standard interval.

From the viewpoint of method it can be seen that for measuring forearm blood flow rate, the invention generally follows these steps:

1. With the hand circulation occluded, occlude the venous outflow from the subject's limb.
2. Electrically measure over a specified time the change in arm circumference occasioned by said venous occlusion.
3. Electrically combine the signal representative of the percentage change in circumference with a signal representative of a change in circumference of known amount and with a signal representative of the resting circumference of the limb.
4. Electrically convert said combined signals to the percentage change in volume per minute to obtain a measure of forearm blood flow.

Wheatstone bridge circuits, one or two strand strain gauges, volume plethysmographs, and other electrical and mechanical length and volume measuring, signaling, recording and computing systems may be adopted for purposes of measuring, recording and printing out the rate of change in volume of a limb. The word "limb" is used to refer to limbs of animals as well as those of humans.

II. DIGITAL LOGIC CIRCUIT OPERATIONS

Figure 6:
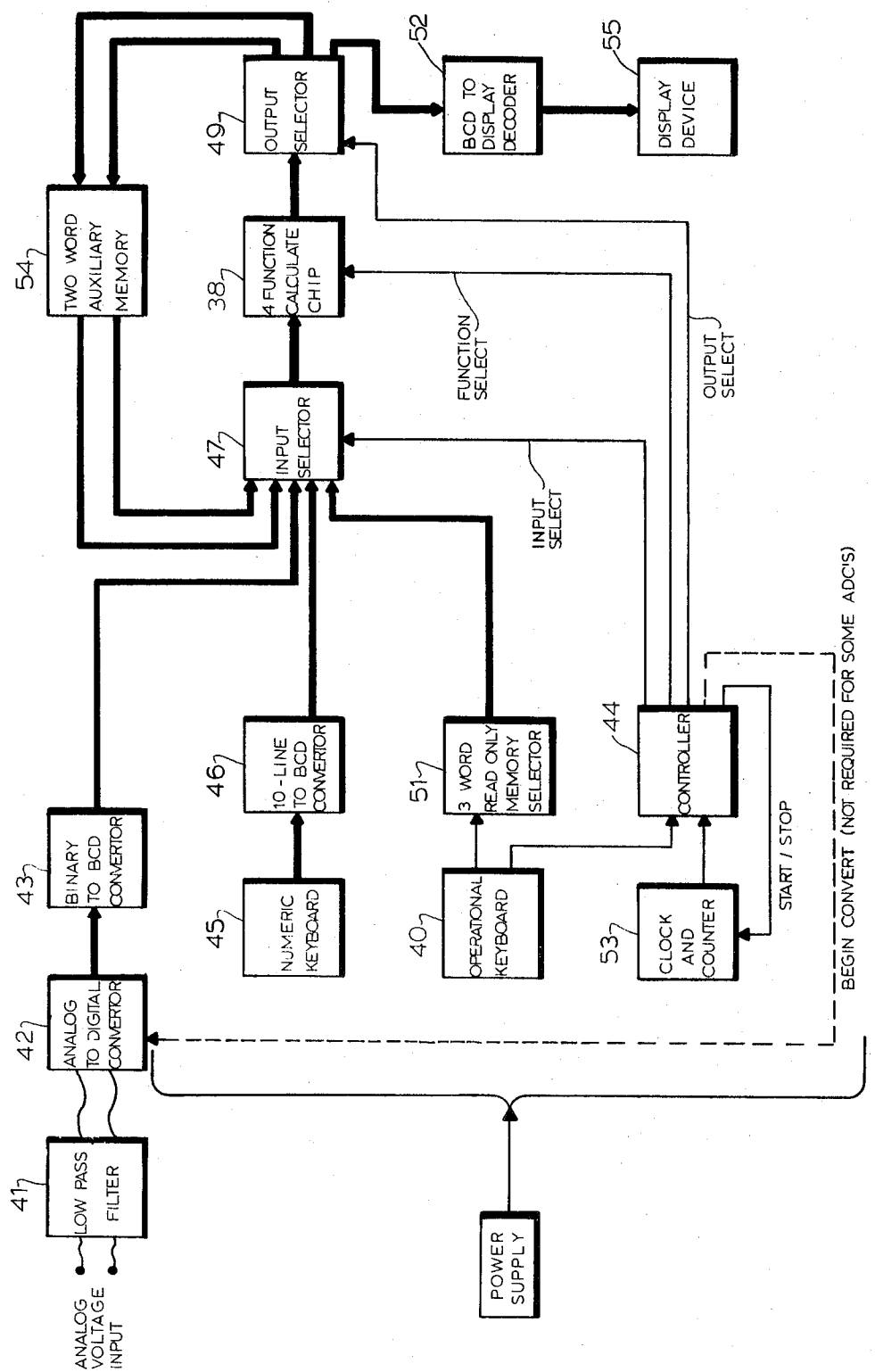
FIG. 6 is a block diagram of a logic circuit suited to the purposes of the invention.

An electronic circuitry relevant to a specific embodiment of the apparatus is shown in block diagram form in FIG. 6. This circuitry implements the manipulations and calculations necessary to the operation of the forearm blood flow apparatus, wherein the operator can select measurement trial durations of three different lengths. Major functional units are numbered in FIG. 6 for reference in this discussion. The flow of digitally encoded data (irrespective of the specific coding format) is shown by heavy arrows. As a consequence, each arrow represents many wires necessary for the parallel flow of a full digital word of eight bits or its information equivalent in other coding formats. All control lines are represented in the figure by light arrows irrespective of the actual number of wires required to implement each specific control function.

The heart of the circuit is a four function calculator chip 38 which performs the arithmetic operations: add, subtract, multiply, and divide. Although alternatives are available, the calculator chip shown here requires that the operands be presented at the input in a binary coded decimal form (BCD). The results of the arithmetic operations are similarly available in BCD at the chip's output or accumulator. The arithmetic function performed by the chip is selected by means of several "function control" lines. In the figure these lines are shown as originating within the device controller 44.

The input to the calculator chip 38 is chosen in the input selector 47. This selector consists in a multilevel gating network actuated by the controller 44. Five sources are available as potential inputs to the calculator chip:

1. The analog to digital converter (ADC) 42 as suitably encoded by the binary to binary coded decimal (BCD) converter 43.
2. The numeric keyboard 45 as encoded by the ten-line to BCD converter 46.
3. One preselected word from the three word read-only memory (ROM) 51.
4. Word 1 of the two word random-access read-write memory (RAM) 54.
5. Word 2 of the two word RAM 54.

The output from the calculator chip 38 is similarly gated to its desired destination in the output selector 49 as directed by the controller 44. Three potential destinations are shown in FIG. 6:

1. The display device 55 via a suitable decoding network 52.
2. Word 1 of the two word RAM 54.
3. Word 2 of the two word RAM 54.

In a further embodiment of the concept an additional read-write memory stack may be used to record the output of the calculator chip 38 at the end of each measurement trial. This memory stack would represent an additional potential destination to be selected in the output selector 49. It would also represent an additional potential input to be selected in the input selector 47 so that the data from several measurements could be averaged at their conclusion.

In the normal use of the circuit of FIG. 6, the circumference in millimeters of the forearm under measurement is entered by the operator via the numeric keyboard 45 which contains buttons for each of the digits zero through nine. Data from the calibration procedure and the measurement trials are input to the circuit through the low pass filter 41 and the ADC 42. The filter has a time constant of about two seconds, and the ADC resolves the input voltage into a binary number of eight bits plus sign.

The two memory units 54 and 51 serve as inputs to the calculator chip 38 at the conclusion of each diagnostic trial when forearm blood flow is actually calculated. Each word is specified by four binary coded decimal digits. Word No. 1 of the RAM 54 is used to store the forearm circumference in millimeters. Word No. 2 of the RAM 54 is used to store the voltage difference which represents a change in circumference of one millimeter. Each of these words is used in every forearm blood flow calculation. In contrast, only one of the three words of ROM 51 is used in any given calculation. These words contain appropriate normalization factors for each of three operator selected trial durations (e.g., 1, 5 and 10 seconds). The normalization factor is two hundred divided by the duration of the trial in minutes. The appropriate word is used as an input to the calculator chip 38 at the conclusion of all other operations in order that the resultant forearm blood flow be expressed in percent change in volume per minute. The preselection of the applicable word from ROM 51 is made by the same switch on the operational keyboard 40 that selects the trial duration. This "Trial Duration Selector Switch" is also shown as 31 in FIG. 2. The duration is measured by the clock and counter 53 and detected by the controller 44.

The output from the calculator chip 38 is directed to the two word read-write memory 54 when storage is required for the forearm circumference and for calibration data. At the conclusion of each measurement phase it is directed to the display device 55 via a suitable decoding network 52. The display device may, for example, be either a seven segment light emitting diode display or a heat sensitive paper tape writer. In an alternative embodiment, the output to the display device decoder might also be gated to an additional memory stack (not shown) for subsequent averaging of the results from several measurement phases. This memory stack may consist of at least two words: one for accumulating the sum of the FBF results from the various trials, and another for accumulating the number of these trials. The four function calculator chip may be used to perform the additions required to fashion these sums. At the conclusion of several measurement trials, the same calculator chip may be used to form the quotient of these two memory words thereby giving the average FBF.

III. DETAILED FUNCTION OF DIGITAL LOGIC CIRCUITRY

The operation of this circuit in normal use is detailed in the three column chart below. Column I describes the activities of the operator. Column II details the functional characteristics of the controller 44, as it dictates the circuit operation, and Column III describes the resulting data flow. A more detailed and specific implementation of digital logic circuitry for the controller has not been given inasmuch as with the information given its function can be realized in several current hardware technologies by one skilled in the practice of digital circuit design.

| | I<br>Operator Activity | | II<br>Controller Function | III<br>Resultant Data Flow |
|---|---|---|---|---|
| 1. | Positions strain gauge within calibration apparatus on forearm and does several trial measurements of flow to ensure reasonable adjustment, changing sensitivity of amplifier if necessary. | | None | None |
| 2. | Depresses self-latching button "Calibrate" on operational keyboard | a. | Enables "clear accumulator" control line to calculator chip | |
| | | b. | Enables "ADC select" lines to input selector and perhaps (depending upon specific ADC employed) "begin convert" line to ADC | Input voltage converted to BCD format and gated to calculator chip accumulator |
| | | c. | Enables "add" control lines to calculator chip | |
| 3. | Turns calibration screw at strain gauge, expanding circumference by one millimeter | | None | None |
| 4. | Releases self-latching "calibrate" button | a. | Enables "clear input" line to calculator chip and perhaps enables "begin convert" line to ADC | The BCD encoded voltage difference representing a change in circumference of 1 mm is found and stored in read-write memory word No. 2 |
| | | b. | Enables read-write memory word No. 2 select lines to output selector | |
| | | c. | Pulses "subtract" control line to calculator chip | |

Continued

| I<br>Operator Activity | II<br>Controller Function | III<br>Resultant Data Flow |
|---|---|---|
| 5. Depresses self-latching button "Enter Circumference" on operational keyboard | a. Enables "clear accumulator" control line to calculator chip<br>b. Enables "keyboard select" lines to input selector | None |
| 6. Enters circumference at numeric keyboard | None | Circumference (in BCD) to calculator chip |
| 7. Releases self-latching "Enter Circumference" button | a. Enables read-write memory word No. 1 select lines to output selector<br>b. Enables "add" control lines to calculator chip | Circumference to read-write memory word No. 1 via calculator chip accumulator |
| 8. Selects duration of a single diagnostic trial via three position switch on operational keyboard | a. Causal switch directly sets comparator to inspect counter for selected duration<br>b. Pre-selects appropriate word in read-only memory | None |
| 9. Inflates cuff and watches polygraph for onset of linear portion of curve | None | None |
| 10. Depresses "Start FBF" button on operational keyboard | a. Enables "clear input" and "clear accumulator" lines to calculator chip and perhaps "begin convert" line to ADC<br>b. Enables "add" control lines to calculator chip | BCD encoded starting voltage to calculator chip accumulator |

Note: The following functions take place without operator intervention.

| | | |
|---|---|---|
| | c. Awaits end of trial as indicated by clock driven counter | None |
| | d. Enables "clear input" line to calculator chip<br>e. Enables "subtract" line to calculator chip<br>f. Enables read-write memory word No. 2 select line to input selector | BCD encoded voltage difference representing change in circumference formed in calculator chip accumulator<br>BCD encoded change in circumference (in mm) forward in calculator chip accumulator |
| | g. Enables "divide" control lines to calculator chip<br>h. Enables read-write memory word No. 1 select lines at input selector<br>i. Enables "divide" control line to calculator chip | The ratio ΔC/C formed in calculator chip accumulator |
| | j. Enables read-only memory select lines at input selector<br>k. Enables display select lines at output selector<br>l. Enables "multiply" control lines | Forearm blood flow in percent volume per minute found, decode and displayed in display device |

Operator may now
a. Initiate a new measurement trial by returning to 9
b. Begin a new subject by returning to 1

Having described the invention, what is claimed is:

1. A portable apparatus for determining the rate of blood flow in a limb comprising, in combination:
   a. first occluding means mountable on the limb for occluding blood flow to the extremity of the limb distal to where said first occluding means is mounted;
   b. second occluding means mountable on the limb proximal of said first occluding means for occluding venous outflow from the limb distal to where said second occluding means is mounted while allowing arterial inflow to continue substantially unimpeded;
   c. occluding control means connected to said first and second occluding means and adapted to cause said occluding means to occlude in the manner stated;
   d. measuring means mountable on the limb between said first and second occluding means and productive of an electrical signal responsive to the change in circumference of said limb between said occluding means when so mounted and when said occluding means are occluding in the respective manner stated;
   e. electrical analyzing circuit means connected to said measuring means, said analyzing circuit means including logic circuit means for receiving and performing arithmetic operations upon electrical signal inputs, said analyzing circuit means further including means to generate and transmit to said logic circuit means electrical signal inputs representative of the circumference of the limb at the point of application of said measuring means, and representative of a change in circumference of known amount, said logic circuit being adapted to receive and combine said electrical signal from said measuring means over a predetermined time period with said electrical inputs and to convert said electrical signal and inputs to a numerical form representing the rate of blood flow required to produce such change in such period of time; and
   f. portable housing means mounting said analyzing circuit and occluding control means and mounting connecting means for connecting said first and second occluding means and said measuring means to the appropriate said analyzing circuit and occluding control means.

2. An apparatus as claimed in claim 1 wherein said measuring means includes a mercury in rubber type strain gauge mountable on said limb.

3. An apparatus as claimed in claim 1 wherein said logic circuitry includes analog to digital conversion circuitry adapted to convert said electrical output into a form compatable with the input requirements of a four function calculator chip such that arithmetic operations can be performed to convert said electrical output into a measure of forearm blood flow.

4. An apparatus as claimed in claim 1, said analyzing circuit means being arranged to receive and measure said electrical signal over any of several different time periods as selected by the operator.

5. An apparatus as claimed in claim 1 wherein said measuring means includes a mercury in rubber type strain gauge mountable on said limb, wherein said logic circuitry includes analog to digital conversion circuitry adapted to convert said electrical output into a form compatable with the input requirements of a four function calculator chip such that arithmetic operations can be performed to convert said electrical output into a measure of forearm blood flow, wherein said occluding means are of the inflatable cuff type and said connecting means includes connecting means adapted to connecting said mercury in rubber type strain gauge and connecting means adapted to connecting said inflatable cuff means.

6. The method of obtaining rate of blood flow in a limb, comprising the steps:
   a. with the limb circulation occluded, occlude the venous outflow from the said limb;
   b. electrically measure over a specified time the change in limb circumference occasioned by said venous occlusion;
   c. electrically combine the signal representative of the percentage change in circumference with a signal representative of a change in circumference of known amount and with a signal representative of the resting circumference of the limb; and
   d. electrically convert said combined signals to the percentage change in volume per minute to obtain a measure of limb blood flow.

* * * * *